US008990376B1

(12) United States Patent
Becker et al.

(10) Patent No.: US 8,990,376 B1
(45) Date of Patent: Mar. 24, 2015

(54) MANAGING SERVER MEMBERSHIP

(71) Applicant: Microsoft Corporation, Redmond, WA (US)

(72) Inventors: Shawn Becker, Seattle, WA (US); David Wells, Lynnwood, WA (US); Karin Meier-Magruder, Redmond, WA (US); Charles McDaniels, Renton, WA (US); Daniel Dawson, Bothell, WA (US); George Ringer, Mercer Island, WA (US); Derek Ingalls, Snohomish, WA (US)

(73) Assignee: Microsoft Technology Licensing, LLC

( * ) Notice: Subject to any disclaimer, the term of this patent is extended or adjusted under 35 U.S.C. 154(b) by 0 days.

(21) Appl. No.: 14/069,650

(22) Filed: Nov. 1, 2013

(51) Int. Cl.
  *G06F 15/173* (2006.01)
  *H04L 12/24* (2006.01)
(52) U.S. Cl.
  CPC ...................................... *H04L 41/50* (2013.01)
  USPC ......................................................... 709/223
(58) Field of Classification Search
  USPC ......................................................... 709/223
  See application file for complete search history.

(56) References Cited

U.S. PATENT DOCUMENTS

| 2007/0074220 A1* | 3/2007 | Edwards et al. .............. 718/104 |
| 2010/0241762 A1 | 9/2010 | Deutsch |
| 2011/0106950 A1* | 5/2011 | Schlack ........................ 709/226 |
| 2013/0080510 A1 | 3/2013 | Lefkin |

* cited by examiner

*Primary Examiner* — Vivek Srivastava
*Assistant Examiner* — Nicholas Celani
(74) *Attorney, Agent, or Firm* — Bryan Webster; Kate Drakos; Micky Minhas (57) ABSTRACT

Example apparatus and methods manage membership in a collection of servers participating in providing a service. An example device may provide a user interface that provides a single coherent view of the in-service state (e.g., in-service, out-of-service) of members of the collection of servers. The example device may also provide a request monitor that selectively blocks a membership request to a target device when the membership request will cause the set of functionalities to be suspended. If a service manager tries to take the only in-service server out-of-service, the action may be selectively blocked and the service manager may receive a notification of the potential result of the action. Taking a server out-of-service may include stopping messages from flowing to the server.

11 Claims, 8 Drawing Sheets

MANAGING SERVER MEMBERSHIP

BACKGROUND

Large internet scale services may have significant topology complexity on the service endpoint side and may have significant service manager fan-out on the service management side. For example, on the service endpoint side (e.g., front end) a large internet scale service may provide its service to tens of millions of consumers using hundreds or thousands of servers. The servers may be organized into pools of servers. Pools of servers may be members of virtual servers. Consumers may not have direct access to members of the pools of servers but rather may have access to a virtual server(s). The virtual server(s) may receive requests from consumers and then route the requests to servers in the pools of servers. A load balancer may be a device or process that routes traffic through a virtual server to an appropriate pool and ultimately to a member server. The front-end topology may become even more complicated when servers appear in more than one pool, when load balancers distribute requests to overlapping sets of servers, when load balancers are arranged in a multi-layer topology, when servers are arranged in a multi-layer topology, when servers provided by different vendors have different capabilities, when load balancers provided by different vendors have different capabilities, when servers or load balancers are added or removed, or for other reasons.

Conventionally, managing server membership in a server pool(s) has been a challenge. Similarly, managing an individual server, virtual server, server pool, or load balancer may have been a challenge. More generally, managing service endpoint devices has been a challenge. The challenges may have been exacerbated by the fan-out on the server management side. For example, to provide 24/7/365 service, a large internet scale service provider may have multiple teams of human service managers and multiple instances of automated service management applications attending the service endpoint devices (e.g., servers, load balancers). Not all service managers may be instantly aware of decisions made by all other service managers. Additionally, not all service managers may have the same information. For example, a first service manager in a first location may have a first set of information about a server or pool of servers while a second service manager in a second location may have a second different set of information about the server or pool of servers. The first set of information may not agree with the second set of information. Thus, the two service managers may simultaneously make different decisions about how to manage a server in a pool of servers.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

Example methods and apparatus are directed towards providing a single, simplified, unified view of manageable service endpoint devices (e.g., actual servers, virtual servers, load balancers) to facilitate making better decisions about managing a device. Managing a service endpoint device like an actual server may include placing the server in-service or taking the server out-of-service. Example methods and apparatus may serialize change requests (e.g., put-in-service, take-out-of-service) from multiple service managers and then monitor the requests to mitigate the likelihood that an undesirable result may be produced. For example, the change requests may be monitored to make sure that the last in-service or healthy server in a server pool is not inadvertently taken out-of-service. Additionally, before a change request is committed, information about the server may be analyzed at levels progressively closer to the device to make sure that the service manager was acting on up-to-date information.

Example methods and apparatus may include a user interface layer, a job queue processing layer, and a communication layer. The user interface layer may present information to service managers and may receive change requests (e.g., put-in-service, take-out-of-service) from service managers. The job queue processing layer may serialize change requests from multiple service managers to mitigate issues associated with concurrent or close-in-time conflicting requests. While a queue is mentioned, other data structures may be used at the job processing layer. The job queue processing layer may also monitor change requests to prevent undesirable results (e.g., service lost because last server taken out-of-service) that may be based on out-of-date information. The communication layer provides information about target device status (e.g., in-service, out-of-service) and transmits change requests or other information to target devices or devices that control target devices. The communication layer may also provide information about target health (e.g., healthy, failed, failing).

BRIEF DESCRIPTION OF THE DRAWINGS

The accompanying drawings illustrate various example apparatus, methods, and other embodiments described herein. It will be appreciated that the illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Example apparatus and methods aggregate information about service endpoint devices (e.g., servers, virtual servers, load balancers) into a single unified view for a service manager. The single unified view may hide the complexity of multi-layer topologies that include tiers of load balancers or pools and tiers of servers to provide a simplified view of service endpoints and their member servers. The single unified view may provide information concerning a server's state (e.g., in service, out of service) or health (e.g., up, down, failing). The server health may be viewed in the context of the different pools in which the server is a member. The single unified view may also provide information about the health of a server pool.

Figure 1:
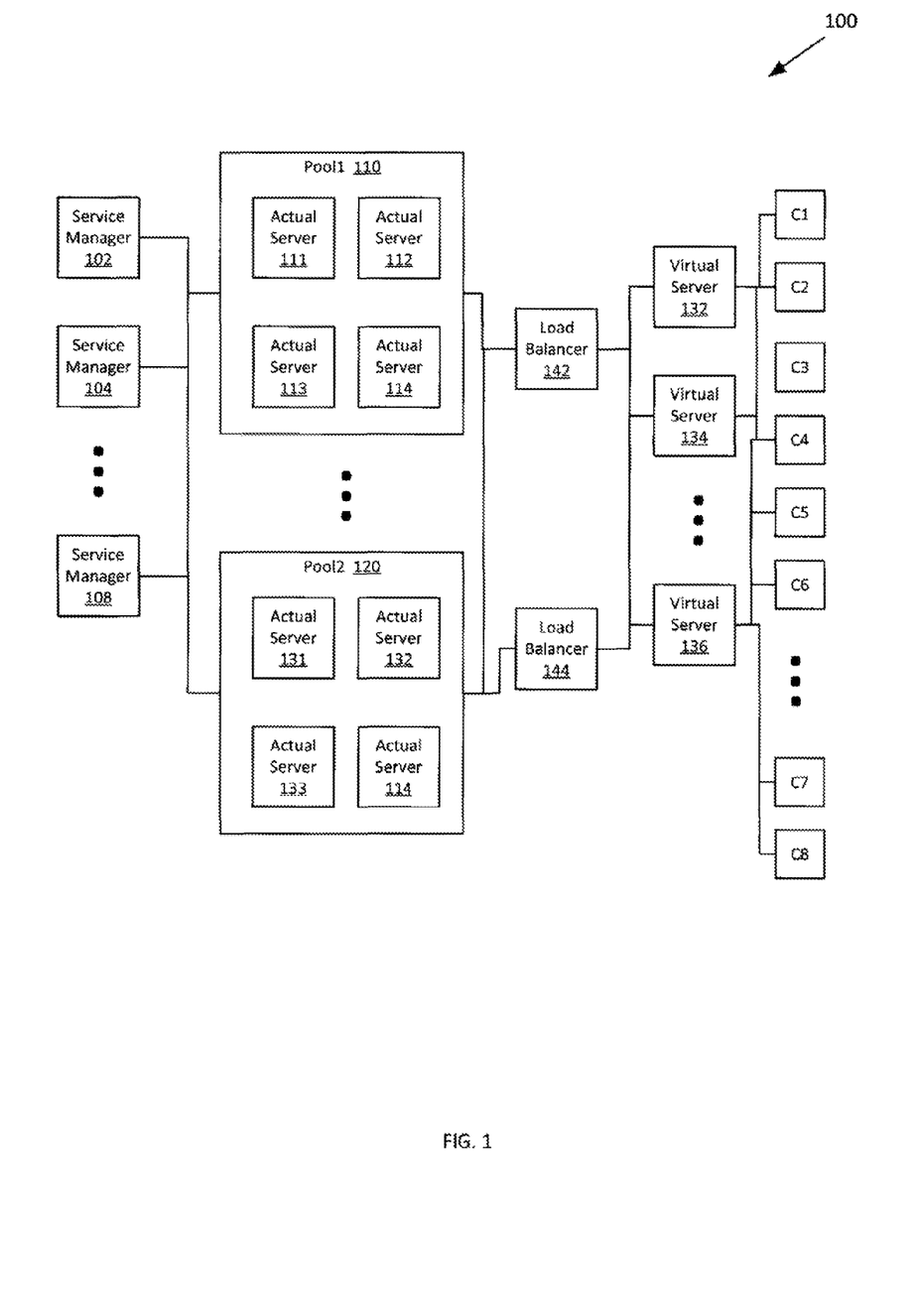
FIG. 1 illustrates an example internet scale service topology with service endpoint devices.

FIG. 1 illustrates an example internet scale service topology 100 with service endpoint devices. The topology 100 includes a number of consumers (e.g., C1 through C8) accessing the service. The service and the apparatus and processes that provide the service may be managed by a number of service managers (e.g., 102, 104 . . . 108). Requests from the consumers may be intended for actual servers but are intercepted by virtual servers (e.g., 132, 134, . . . 136). The virtual servers may send the requests from the consumers to load balancers (e.g., 142, 144). The load balancers may distribute the requests to different actual servers arranged in different pools (e.g., pool1 110, . . . pool2 120) of servers. Pool1 110 includes actual servers 111, 112, 113, and 114. Pool2 120 includes actual servers 131, 132, 133, and 114. Note that actual server 114 appears in two different pools.

Example apparatus and methods may provide role-based authentication that controls access and functionality available to various service managers. For example, a first service manager may be authenticated for read only viewing while a second service manager may be authenticated for read and update viewing.

Service managers perform tasks including placing a server in-service and taking a server out-of-service With the complicated service endpoint topologies that may exist, placing a server in-service or taking a server out-of-service may be a complicated task. The task may be even further complicated when multiple service managers attempt to take a server out-of-service or place a server in-service at or near the same time based on conflicting or potentially out-of-date information. Thus, example apparatus and methods provide a job processing queue that serializes service manager requests. Serializing service manager requests in a job processing queue facilitates resolving concurrent requests or requests that occur close together. Since service manager requests are serialized using the job processing queue or other data structure, an opportunity may exist to monitor change requests (e.g., take out-of-service requests) to prevent undesirable results. For example, a take out-of-service request that is directed to the last healthy server or the last in-service server in a server pool supporting a service end point or acting as a service end point could have the undesirable effect of making the service unavailable to a set of consumers. Therefore, example apparatus and methods may monitor change requests to prevent a server pool from inadvertently becoming empty. In one embodiment, a request that may create an empty server pool may be brought to the attention of a service manager. The service manager may then decide to force the server pool to become empty or may make a different request.

Figure 2:
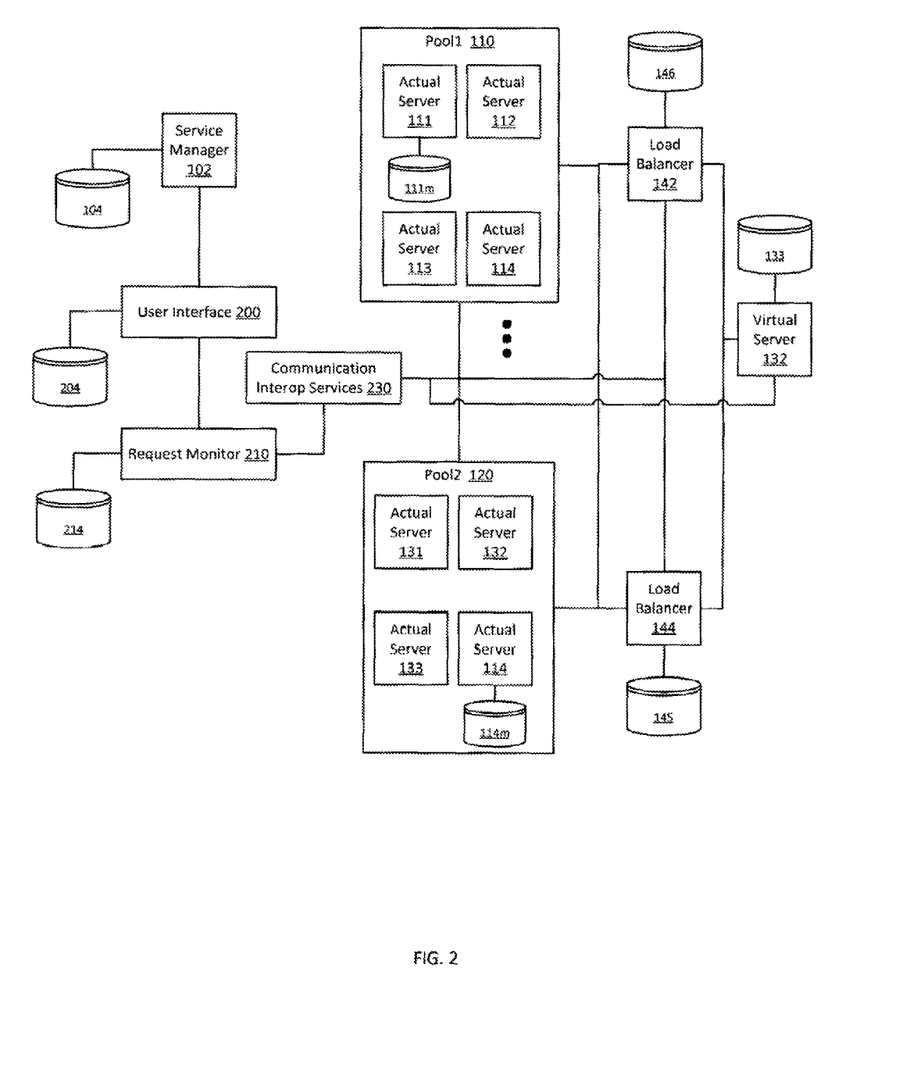
FIG. 2 illustrates an example system for managing server membership.

An example system may include a user interface layer, a job queue layer, and a communication layer. FIG. 2 illustrates an example system for managing server membership for a collection of servers that are co-operating to provide a service. The system includes a user interface 200 that receives requests from a service manager 102. The user interface 200 may also provide a coherent simplified view of the devices involved in providing the service. The system also includes a request monitor 210 that communicates with the user interface 200 and with the devices and processes involved in providing the service. Note that the service manager 102 has its own local storage 104. Similarly, the user interface 200 has its own local storage 204 and the request monitor 210 has its own local storage 214. Additionally, a virtual server 132 may have its own local storage 133, load balancer 142 may have its own local storage 146 and load balancer 144 may have its own local storage 145. Additionally, actual server 111 may have its own local storage 111m. With multiple devices or processes having their own local storage, it is possible that the data about which servers are in-service and which servers are out-of-service may be inconsistent.

The communication layer may communicate with service endpoint devices (e.g., load balancer, actual server, virtual server). The user interface layer may present the single unified view and may receive requests from service managers. For example, the user interface layer may receive put-in-service and take-out-of-service requests. The user interface layer may also provide an opportunity for a service manager to change a request or to force a request when other layers provide information that indicates that a service manager may be acting unwisely or may be acting on data that may be out-of-date or otherwise inaccurate.

The job queue processing layer may serialize requests and perform monitoring on the serialized requests. In one embodiment, the job queue processing layer may also perform peephole-type optimization where multiple identical requests are collapsed into a single request. For example, if five service managers all request at the same time that a certain server be taken out-of-service, the five requests may be collapsed into a single request that is serialized in the job processing queue.

Monitoring the serialized requests in the job queue processing layer may cause requests to be committed or paused. A request may be committed when it is provided to a target device or to another device (e.g., message passer) that controls the target device. For example, a take-out-of-service message may be provided to an actual server, to a virtual server associated with the actual server, to a load balancer (e.g., message passer) that is providing consumer requests to the server, or to other devices that may control or participate in controlling the target device. Taking a server out-of-service may involve stopping the flow of messages to the server, closing communication paths to the server, turning the server off, or other actions. Placing a server in-service may involve starting the flow of messages to the server, opening communication paths to the server, turning the server on, or other actions. Stopping or starting the flow of messages to a server may be achieved at a load balancer without directly messaging or altering the state of the server.

The determination about whether to commit a request or to pause or return a request may depend on having accurate information concerning the target device and the pool(s) of which the target device is a member. Information about the target device or its pool(s) may be stored at the service manager location, in the user interface layer, in the job queue processing layer, in a target device, in a device that controls the target device, in a device that interacts with the target device, or in other locations. The communication layer facilitates acquiring up-to-date information concerning a target device or its pool(s) before committing a request and propagating that information back closer to the back end. Thus, in one embodiment, requests may only be committed when the actual information about a target device or its pool(s) matches the information upon which the service manager based their decision.

Recall that the job queue processing layer may monitor requests to ensure that a server is not taken out-of-service when it is the sole remaining server available in a pool, to a load balancer, to a virtual server, or in other situations. When a take-out-of-service request is received, the request may first be validated by checking the service managers local data set. If the local data set indicates that removing the server would have an undesirable effect (e.g., sole remaining server removed from a pool), then the request may not be automatically committed but may instead be presented to the requesting service manager or other service manager for confirmation or cancellation. If the local data set indicates that removing the server would not produce an undesirable situation, then the request may be validated from data sets that are closer to the target device. By way of illustration, a data set in the job queue processing layer may indicate that the server is the last in-service or healthy server. In this case, the request may be blocked and the data from the job queue processing layer may be used to update the data available to the service manager. For example, a local cache available to the service manager may be updated. The service manager may then choose to force the request to be performed or to cancel the request. By way of further illustration, a data set in a service endpoint device (e.g., load balancer, virtual server, actual server) may indicate that the server is the last in-service or healthy server. In this case, the request may be blocked and the data from the service endpoint device may also be used to update the job queue processing layer and may be used to update the data available to the service manager. Once again the service manager may then choose to force the request to be performed or to cancel the request.

In one embodiment, the data sets maintained throughout the topology with which example apparatus and methods interact may include not just service status (e.g., in/out) information but also health status (e.g., healthy, failed, failing) information. The health status information may report the health as understood by a reporting device (e.g., load balancer, actual server that is target device). Thus, the service manager may have an understanding not only of which devices are in-service and out-of-service, but also of the health state for a device when making a change request.

To facilitate providing a response to the service manager within a desired threshold amount of time, in one embodiment the scope of the validations of server state or health data may be limited to the server that is the target device for the change request rather than the entire data set available. In one embodiment, the job queue processing layer is configured to process change requests (e.g., put-in-service, take-out-of-service) synchronously within fifteen seconds. In different embodiments, other service levels (e.g., twelve seconds, ten seconds, five seconds) may be configured.

Some portions of the detailed descriptions that follow are presented in terms of algorithms and symbolic representations of operations on data bits within a memory. These algorithmic descriptions and representations are used by those skilled in the art to convey the substance of their work to others. An algorithm is considered to be a sequence of operations that produce a result. The operations may include creating and manipulating physical quantities that may take the form of electronic values. Creating or manipulating a physical quantity in the form of an electronic value produces a concrete, tangible, useful, real-world result.

It has proven convenient at times, principally for reasons of common usage, to refer to these signals as bits, values, elements, symbols, characters, terms, numbers, and other terms. It should be borne in mind, however, that these and similar terms are to be associated with the appropriate physical quantities and are merely convenient labels applied to these quantities. Unless specifically stated otherwise, it is appreciated that throughout the description, terms including processing, computing, and determining, refer to actions and processes of a computer system, logic, processor, or similar electronic device that manipulates and transforms data represented as physical quantities (e.g., electronic values).

Example methods may be better appreciated with reference to flow diagrams. For simplicity, the illustrated methodologies are shown and described as a series of blocks. However, the methodologies may not be limited by the order of the blocks because, in some embodiments, the blocks may occur in different orders than shown and described. Moreover, fewer than all the illustrated blocks may be required to implement an example methodology. Blocks may be combined or separated into multiple components. Furthermore, additional or alternative methodologies can employ additional, not illustrated blocks.

Figure 3:
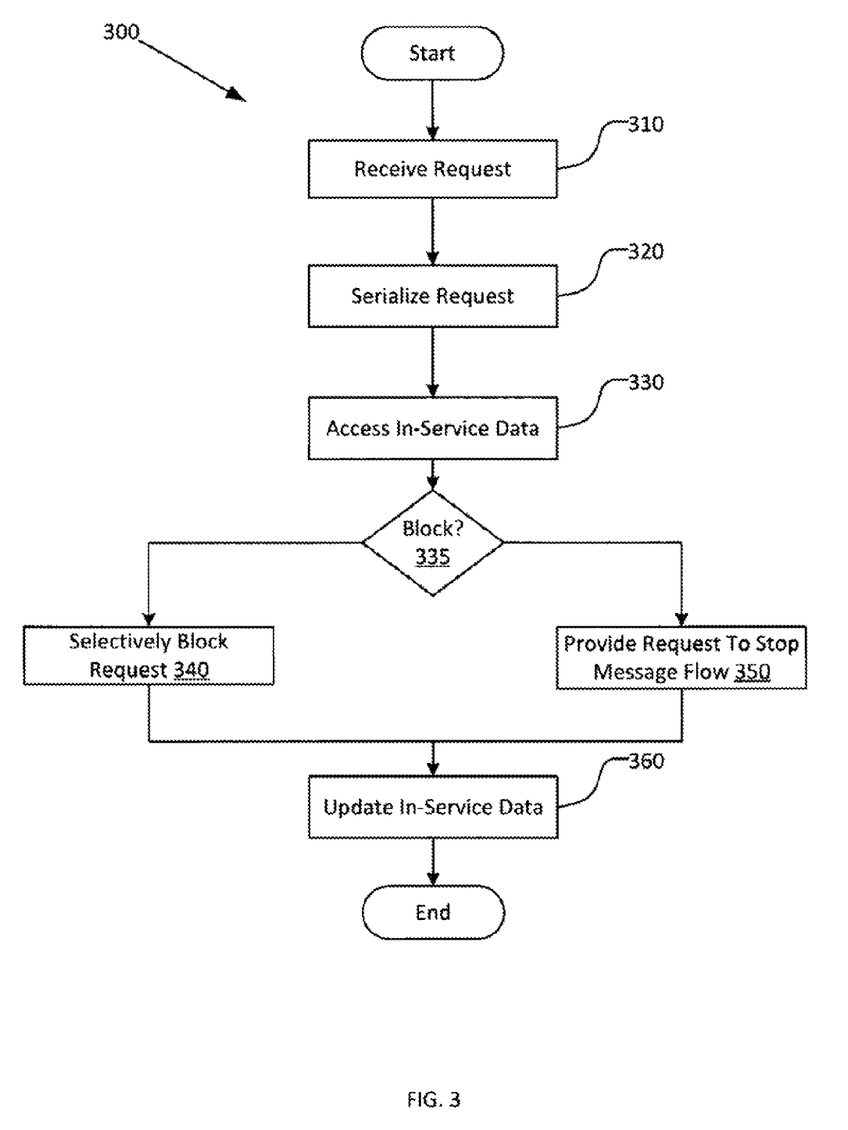
FIG. 3 illustrates an example method associated with managing server membership.

FIG. 3 illustrates an example method 300. Method 300 includes, at 310, receiving a service management request concerning a service endpoint device. The service endpoint device may be, for example, a server that is a member of a collection of servers that are co-operating to provide a service. Other devices may be managed using method 300. A service may be, for example, a set of functionalities provided through a communication network. The communication network may be, for example, a computer network, a cellular telephone network, a satellite telephone network, or other network. The service management request may be, for example, a take-out-of-service request that is intended to stop message flow to the service endpoint device. The service management request may be optional or mandatory. When the request is optional, method 300 may check in-service data to determine whether an undesired result may occur if the service endpoint device is in fact taken out-of-service. The undesirable result may be, for example, removing the last healthy server and thus interrupting service, removing a server with available capacity when all other servers are at or near capacity resulting in a service slowdown, or other undesirable effect. In different embodiments, the service management request may be received from a human service manager or from an automated service manager.

Method 300 includes, at 320, controlling a serialization logic to serialize the service management request with respect to other pending service management requests concerning members of the collection. The serialization logic may be located in a communication path in the communication network between the service manager and the control device. Serializing the requests facilitates avoiding race conditions and mitigating issues associated with variable delivery times from different service managers. In one embodiment, method 300 may include controlling the serialization logic to perform peephole optimization on pending service management requests. Performing peephole optimization facilitates reducing the number of requests that need to be processed.

Once the request has been serialized into its correct location, method 300 may continue by processing the service management request in order with respect to the other pending service management requests. If the request is an optional attempt to take the service endpoint device out-of-service, then method 300 may proceed, at 330, by accessing in-service data from which a determination can be made at 335 concerning whether the service endpoint device is the only in-service service endpoint device in the collection. In one embodiment, the in-service data may also describe the health of the service endpoint device. The determination may be made at 335 in an incremental fashion by accessing and evaluating in-service data in order from the data located closest to the service manager to the data located closest to the control device (e.g., load balancer) that controls message flow to the service endpoint device. In one embodiment, the in-service data may also describe the capacity of the service endpoint or capacities of other members of a pool with which the service endpoint is associated. If the data closest to the service manager indicates that the request may produce an undesirable condition (e.g., last in-service server taken out of service, last load balancer taken out of service, last server with available capacity taken out of service) then the request may be blocked without having to consult data closer to the device. But if the data closest to the service manager does not indicate that the request may produce an undesirable result then data closer to the load balancer may be considered.

In one embodiment, before the request is processed, method 300 may include acquiring the in-service data from one or more members of the collection or from the control device. To help the service manager make a more informed decision, the in-service data may be provided to the service manager. In one embodiment, the in-service data may be provided to the service manager through a user interface that provides a single coherent view of the in-service status of the collection of service endpoint devices.

Accessing the in-service data at 330 may begin by accessing data local to the service manager. At this point, the determination may be made solely as a function of the data local to the service manager. If the data local to the service manager indicates that the service may not be compromised by taking the service endpoint device out-of-service, then the request may be provided to the serialization logic where accessing the in-service data at 330 may continue by accessing data local to the serialization logic. In one embodiment, the message may not actually be provided to the serialization logic but rather the request may be held in place and the serialization logic may be informed of the request and controlled to access the in-service data available at the serialization logic. Informing the serialization logic or another device or process may include sending a message, generating an interrupt, writing a value to a shared memory location, generating a signal, making a remote procedure call, or other action. The determination may then be a function of the data local to the serialization logic. If the data local to the serialization logic indicates that the service may not be compromised by taking the service endpoint device out-of-service, then the request may be provided to the control device and accessing the in-service data at 330 may include accessing data local to the control device. Once again, the request may not actually be provided to the control device but rather just the in-service data at the control device may be accessed. The control device may be located in a communication path in the communication network between the serialization logic and the service endpoint device. At this point, making the determination may be a function of the data local to the control device.

After the in-service data has been accessed at 330, a determination may be made at 335 concerning whether to block the request or commit the request. Based on the determination made at 335, method 300 may proceed to 340 or 350. Method 300 includes, at 340, selectively blocking the request when the determination is that the service endpoint device is the only in-service service endpoint device in the collection or when another pre-determined undesirable effect may be created. When the request is blocked, method 300 may also selectively provide the service management request back to the service manager with a notification or may notify the service manager without returning the request.

Method 300 includes, at 350, selectively providing the request to the control device when the determination is that the service endpoint device is not the only in-service service endpoint device in the collection or when another pre-determined undesirable effect may be created. In one embodiment, the request may not be provided, but the control device may be instructed or controlled to take the target server out-of-service.

Whether the request is provided to the control device at 350 or blocked at 340, method 300 may include, at 360, selectively updating the in-service data in one or more locations in the communication network. For example, the data in the serialization logic may be updated with data from the load balancer.

In one embodiment, before processing requests from the service manager, the service manager may first be authenticated. When authentication is employed, method 300 may provide a role-based service level for the service manager as a function of authenticating the service manager. For example, the service manager may be allowed to view in-service data but not make requests, or the service manager may be allowed to make requests.

Figure 4:
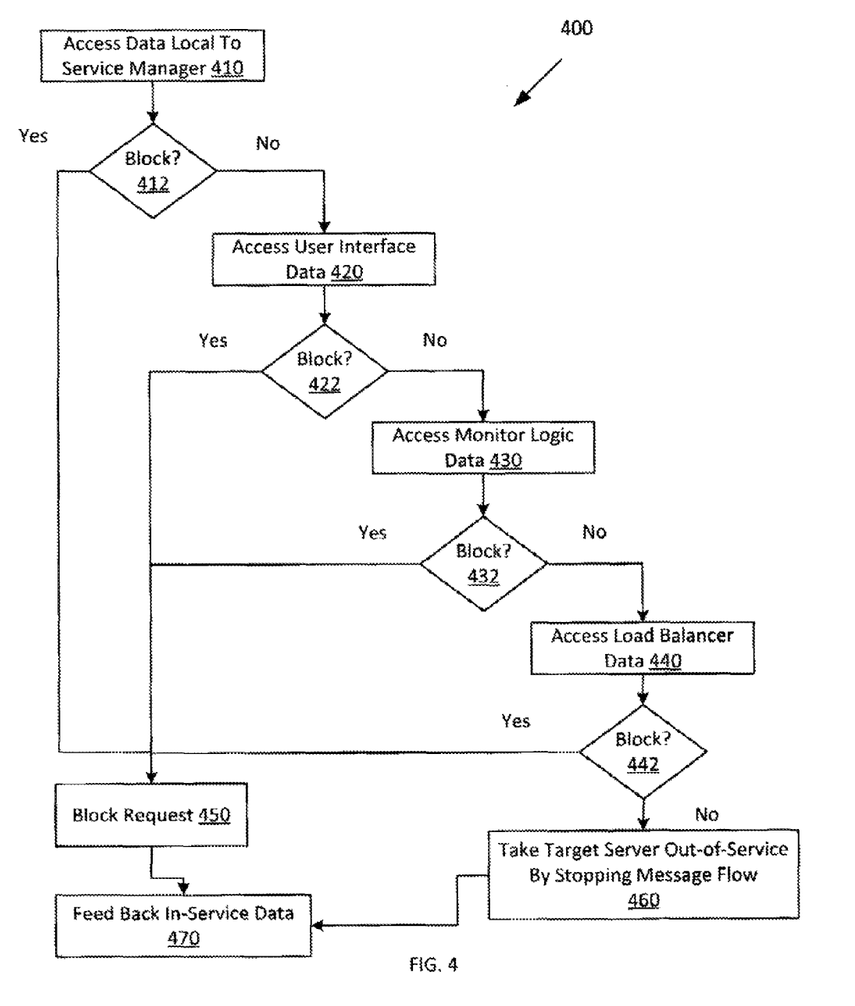
FIG. 4 illustrates an example method associated with managing server membership.

Using the incremental, serialized approach described in connection with method 300 may, in one embodiment, produce an asynchronous result in less than fifteen seconds. The asynchronous result may be the service endpoint device being taken out-of-service or the service manager being provided with the notification in less than fifteen seconds. In another embodiment, the asynchronous result may be achieved in less than ten seconds. Other response times may be achieved in other embodiments, FIG. 4 illustrates a portion 400 of an example method that performs an incremental decision making process. At 410, data local to a service manager is accessed. Being local to the a device may include being stored in a data store that is part of the device or being stored in a data store that is available to the device without having to transit a network. For example, data stored in the memory of a laptop computer being used by a service manager is local to the service manager, as is data that is stored on an external hard drive connected to the service manager's laptop. A decision about whether to block the take-out-of-service request may be made at 412 based on just the data local to the service manager. If the data local to the service manager indicates that the request could be completed without disrupting the service, then portion 400 may proceed at 420 to access data stored in a user interface. The data stored local to the service manager may not be consistent with the data at the user interface. Thus, the data stored local to the service manager may indicate that it is safe to proceed with the take-out-of-service request but the data at the user interface may not. Thus, a decision about whether to block the take-out-of-service request may be made at 422 based on just the data local to the user interface. The incremental approach may continue at 430 by accessing data local to a monitor logic and then making the determination at 432 based on just the data local to the monitor logic. The incremental approach may then continue at 440 by accessing data local to a load balancer that controls message flow to the server that is the target of the take-out-of-service request. The decision at 442 may be based on just the data stored local to the load balancer. Only if all the data considered indicates that it is safe to proceed will the target server be taken out of service at 460 by stopping message flows to the server. If any of the data considered indicates that it is unsafe to proceed then the request will be blocked at 450. In either case, data concerning the in-status state of the target server may be fed back at 470 to data stores located closer to the service manager. The incremental approach illustrated in FIG. 4 facilitates reaching a blocking decision as fast as possible.

While FIGS. 3 and 4 illustrate various actions occurring in serial, it is to be appreciated that various actions illustrated in FIGS. 3 and 4 could occur substantially in parallel. By way of illustration, a first process could access and display in-service data, a second process could serialize membership requests, and a third process could block or commit membership requests. While three processes are described, it is to be appreciated that a greater or lesser number of processes could be employed and that lightweight processes, regular processes, threads, and other approaches could be employed.

In one example, a method may be implemented as computer executable instructions. Thus, in one example, a computer-readable storage medium may store computer executable instructions that if executed by a machine (e.g., computer) cause the machine to perform methods described or claimed herein including method 300 or portion 400. While executable instructions associated with the listed methods are described as being stored on a computer-readable storage medium, it is to be appreciated that executable instructions associated with other example methods described or claimed herein may also be stored on a computer-readable storage medium. In different embodiments, the example methods described herein may be triggered in different ways. In one embodiment, a method may be triggered manually by a user. In another example, a method may be triggered automatically.

Figure 5:
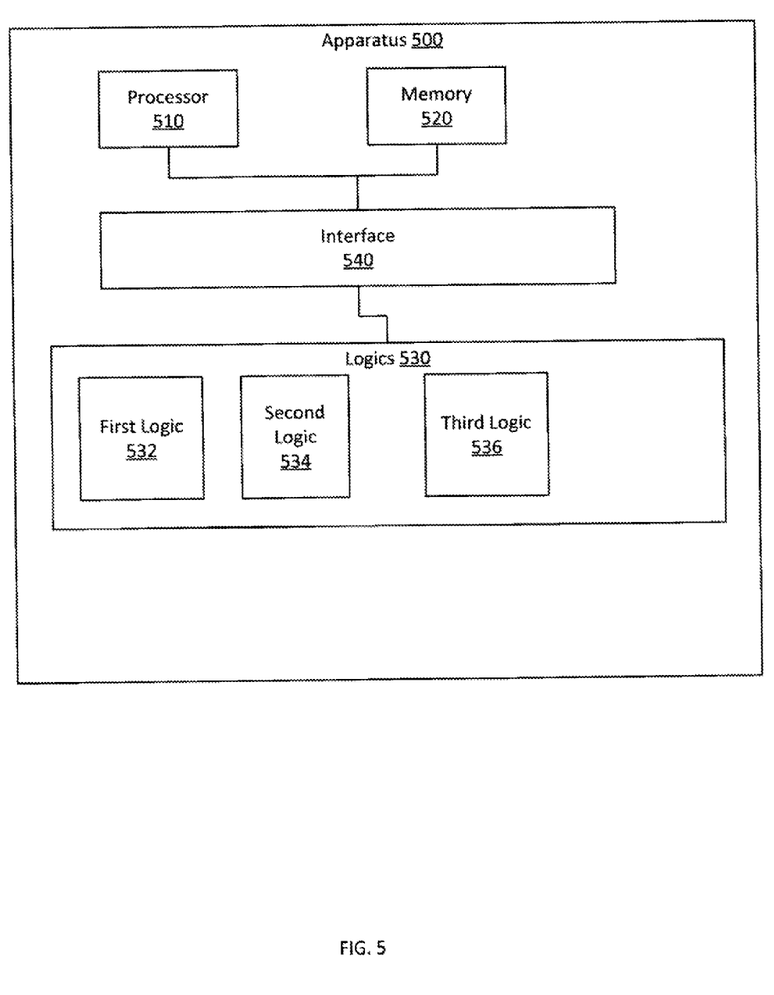
FIG. 5 illustrates an example apparatus associated with managing server membership.

FIG. 5 illustrates an example apparatus 500. In one example, the apparatus 500 includes an interface 540 that is configured to connect a processor 510, a memory 520, and a set 530 of logics. Elements of the apparatus 500 may be configured to communicate with each other, but not all connections have been shown for clarity of illustration. In one embodiment, the apparatus 500 may be a general purpose computer that has been transformed into a special purpose computer through the inclusion of the set of logics 530. Apparatus 500 may interact with other apparatus, processes, and services through, for example, a computer network.

The set 530 of logics may be configured to manage membership in a collection of servers providing a service. Providing the service may include having the servers individually and collectively participate in providing a set of functionalities through a computer network.

The set 530 of logics may include a first logic 532 that is configured to provide a user interface. The user interface may be configured to provide a single coherent view of the in-service status of the collection of servers. In one embodiment, the single coherent view may collapse tiers in a hierarchy of servers. Collapsing the tiers may facilitate hiding the complexity of multi-layer load balanced/network topologies to provide a simple view of service endpoints and their member servers. In one embodiment, the user interface may aggregate servers or pools of servers across multiple load balancing devices into one unified view. In one embodiment, the first logic 532 may be configured to collect status data from the collection of servers and selected elements of the computer network. The first logic 532 may also be configured to receive the membership request and to provide a response to the membership request. The membership request may be, for example, a put-in-service request that would add a target server to the membership of a collection of servers that are currently participating in providing the service. The membership request may also be, for example, a take-out-of-service request that would remove the target server from the membership of a collection of servers that are participating in providing the service.

The set 530 of logics may also include a second logic 534 that is configured to provide a request monitor that is configured to selectively block a membership request to a target server in the collection of servers when the membership request will disrupt access to the set of functionalities. Access to the set of functionalities may be disrupted when, for example, the last available target server is taken out of service, the healthiest available target server is taken out of service, a target server with available capacity is taken out of service when other servers are healthy but over-whelmed, or under other conditions. The request monitor may be configured to operate in an incremental fashion where data farthest from the target device is considered first and data closest to the target device is considered last. A decision to block may be made at different times as different data sets are analyzed while a decision to proceed may involve analyzing multiple available data sets. In one embodiment, the request monitor is configured to block the membership request when data stored by the entity that makes the membership request (e.g., service manager) indicates that the membership request would disrupt access to the set of functionalities. The request monitor may block the request when data stored by the user interface indicates that the membership request would disrupt access to the set of functionalities. However, data stored by or local to the user interface may only be considered if the data stored by or local to the entity indicates that the membership request would not disrupt access to the set of functionalities. The request monitor may block the request when data stored by the request monitor indicates that the membership request would disrupt access to the set of functionalities. However, data stored by or local to the request monitor may only be considered if the data stored by the user interface indicates that the membership request would not disrupt access to the set of functionalities. The request monitor may block the request if data stored by or local to a control device in the computer network indicates that the membership request would disrupt access to the set of functionalities. However, data stored by or local to the control device may only be considered if the data stored by or local to the request monitor indicates that the membership request would not disrupt access to the set of functionalities. Recall that the control device (e.g., load balancer) controls message flow to the target server.

Looked at from the non-blocking point of view, the request monitor is configured to provide the membership request to the control device or to instruct the control device only if data stored by or local to the entity that makes the membership request indicates that the membership request would not disrupt access to the set of functionalities, if data stored by or local to the user interface also indicates that the membership request would not disrupt access to the set of functionalities, if data stored by or local to the request monitor also indicates that the membership request would not disrupt access to the set of functionalities, and if data stored by or local to the control device also indicates that the membership request would not disrupt access to the set of functionalities. In one embodiment, "providing the membership request" means controlling the device to cause a flow of messages to the target server to be stopped. The actual membership request may not be provided to the control device.

The set 530 of logics may also include a third logic 536 that is configured to provide communications. The third logic 536 may provide a set of interop services that provide communications for the user interface, the request monitor, members of the collection of servers, the target server, and load balancing devices that control message flows to members of the collection of servers.

Processor 510 may be, for example, a signal processor, a microprocessor, an application specific integrated circuit (ASIC), or other control and processing logic circuitry for performing tasks including signal coding, data processing, input/output processing, power control, or other functions.

Processor 510 may be configured to interact with the logics 530 that process the membership requests.

Memory 520 can include non-removable memory or removable memory. Non-removable memory may include random access memory (RAM), read only memory (ROM), flash memory, a hard disk, or other memory storage technologies. Removable memory may include flash memory or other memory storage technologies such as "smart cards." Memory 520 may be configured to store membership requests, in-service data, health data, or other information.

Figure 6:
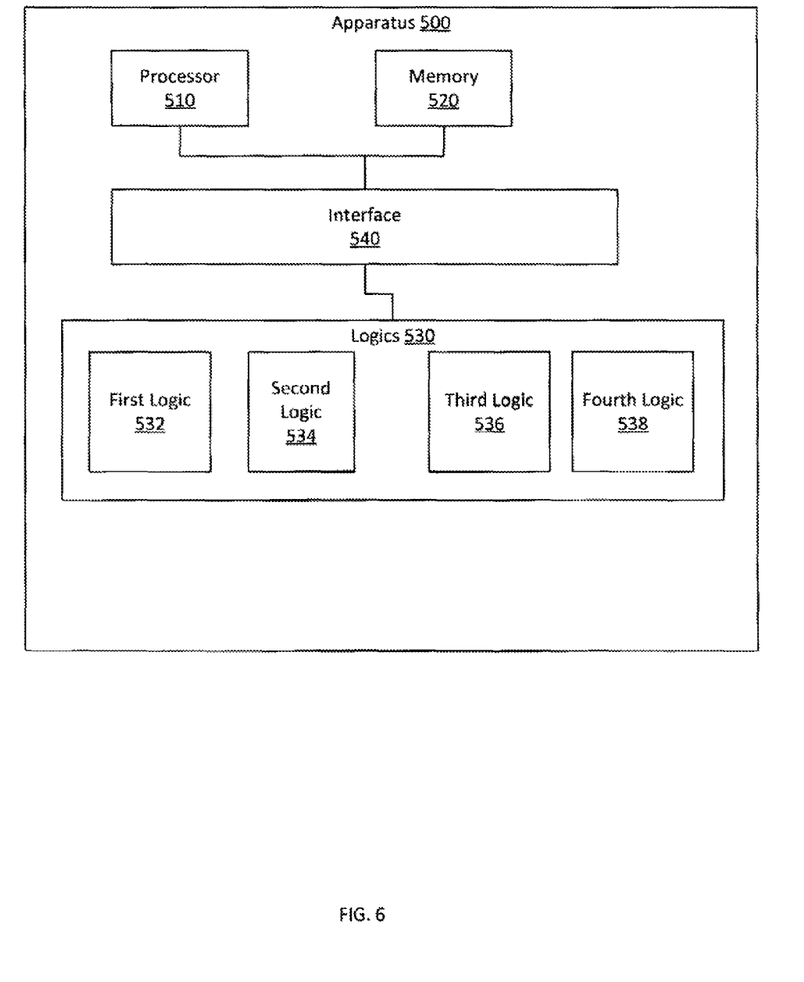
FIG. 6 illustrates an example apparatus associated with managing server membership.
Figure 7:
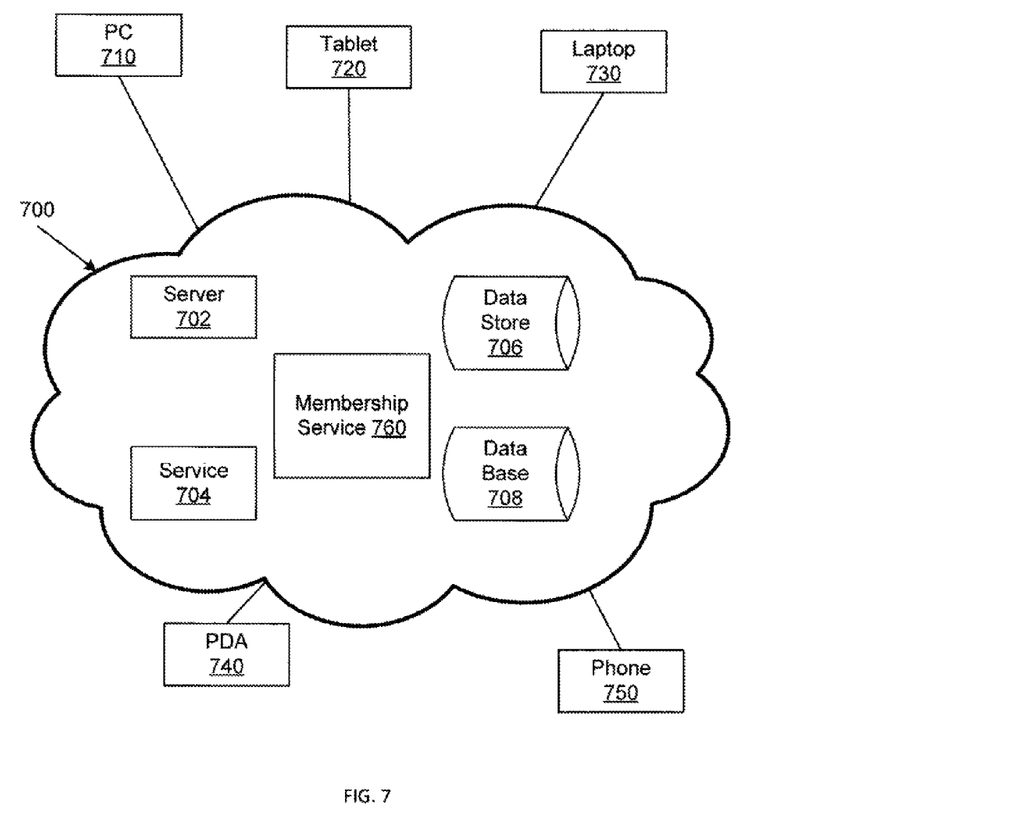
FIG. 7 illustrates an example cloud operating environment in which a server membership service may operate.

FIG. 6 illustrates another embodiment of apparatus 500. This embodiment of apparatus 500 includes a fourth logic 538. Fourth logic 538 may be configured to selectively update data stored in various locations in response to a blocked membership request or in response to taking a server out-of-service. Data that may be updated may include data stored by the entity that makes the membership request, data stored by the user interface, data stored by the request monitor, or data stored by the control device FIG. 7 illustrates an example cloud operating environment 700. A cloud operating environment 700 supports delivering computing, processing, storage, data management, applications, and other functionality as an abstract service rather than as a standalone product. Services may be provided by virtual servers that may be implemented as one or more processes on one or more computing devices. In some embodiments, processes may migrate between servers without disrupting the cloud service. In the cloud, shared resources (e.g., computing, storage) may be provided to computers including servers, clients, and mobile devices over a network. Different networks (e.g., Ethernet, Wi-Fi, 802.x, cellular) may be used to access cloud services. Users interacting with the cloud may not need to know the particulars (e.g., location, name, server, database) of a device that is actually providing the service (e.g., computing, storage). Users may access cloud services via, for example, a web browser, a thin client, a mobile application, or in other ways.

FIG. 7 illustrates an example membership service 760 residing in the cloud. The membership service 760 may rely an a server 702 or service 704 to perform processing and may rely on a data store 706 or database 708 to store data. While a single server 702, a single service 704, a single data store 706, and a single database 708 are illustrated, multiple instances of servers, services, data stores, and databases may reside in the cloud and may, therefore, be used by the membership service 760.

FIG. 7 illustrates various devices accessing the membership service 760 in the cloud. The devices include a computer 710, a tablet 720, a laptop computer 730, a personal digital assistant 740, and a mobile device (e.g., cellular phone, satellite phone) 750. It is possible that different users at different locations using different devices may access the membership service 760 through different networks or interfaces. In one example, the membership service 760 may be accessed by a mobile device 750. In another example, portions of membership service 760 may reside on a mobile device 750. Membership service 760 may perform actions including, for example, providing a single comprehensive view of server membership and status through a user interface, selectively blocking take-out-of-service requests that may lead to a service becoming at least partially unavailable, causing message flows to a server to be halted, updating data stores in a topology with which the membership service 760 interacts, or other actions. In one embodiment, membership service 760 may perform portions of methods described herein (e.g., method 300, method 400).

Figure 8:
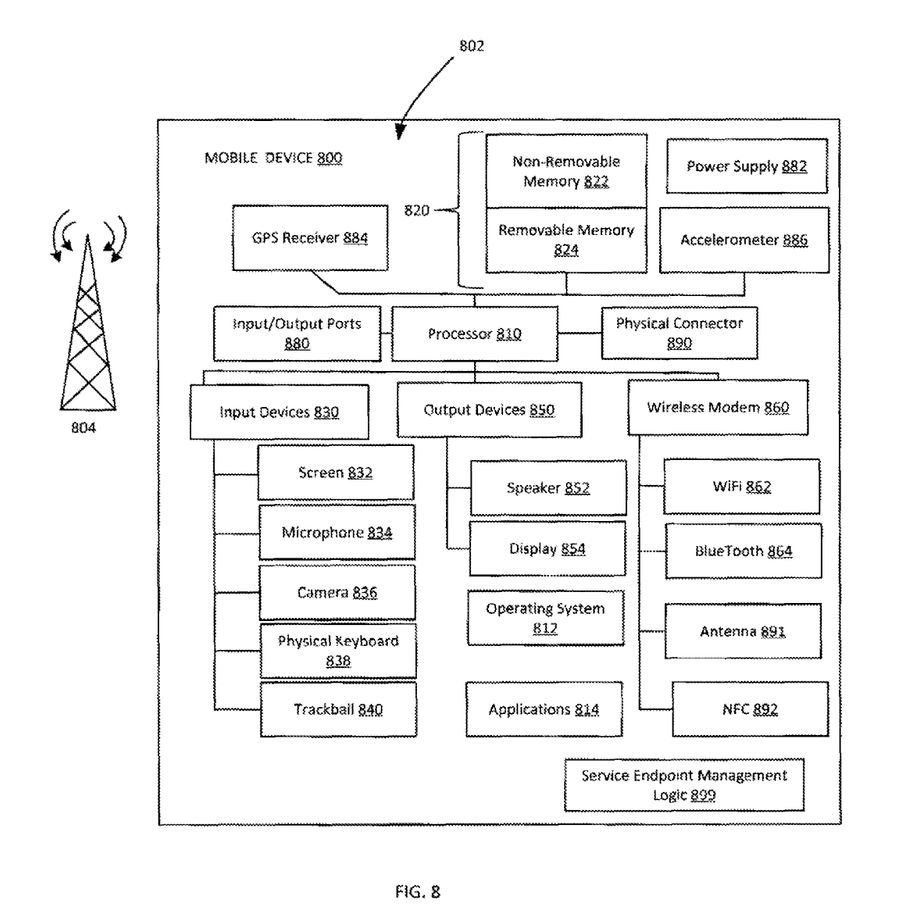
FIG. 8 is a system diagram depicting an example mobile communication device configured with logic for managing server membership.

FIG. 8 is a system diagram depicting an exemplary mobile device 800 that includes a variety of optional hardware and software components, shown generally at 802. Components 802 in the mobile device 800 can communicate with other components, although not all connections are shown for ease of illustration. The mobile device 800 may be a variety of computing devices (e.g., cell phone, smartphone, handheld computer, Personal Digital Assistant (PDA), etc.) and may allow wireless two-way communications with one or more mobile communications networks 804, such as a cellular or satellite networks.

Mobile device 800 can include a controller or processor 810 (e.g., signal processor, microprocessor, application specific integrated circuit (ASIC), or other control and processing logic circuitry) for performing tasks including providing a single comprehensive view of server membership and status through a user interface, selectively blocking take-out-of-service requests that may lead to a service becoming at least partially unavailable, causing message flows to a server to be halted, updating data stores in the user interface, or other functions. An operating system 812 can control the allocation and usage of the components 802 and support application programs 814. The application programs 814 can include mobile computing applications (e.g., email applications, calendars, contact managers, web browsers, messaging applications), or other computing applications.

Mobile device 800 can include memory 820. Memory 820 can include non-removable memory 822 or removable memory 824. The non-removable memory 822 can include random access memory (RAM), read only memory (ROM), flash memory, a hard disk, or other memory storage technologies. The removable memory 824 can include flash memory or a Subscriber Identity Module (SIM) card, which is known in GSM communication systems, or other memory storage technologies, such as "smart cards." The memory 820 can be used for storing data or code for running the operating system 812 and the applications 814. Example data can include data that describes whether a server is in-service or out-of-service, data that describes the number of servers in a collection of servers that are in-service, data that describes the health of a server, web pages, text, images, sound files, video data, or other data sets to be sent to or received from one or more network servers or other devices via one or more wired or wireless networks. The memory 820 can store a subscriber identifier, such as an International Mobile Subscriber identity (IMSI), and an equipment identifier, such as an International Mobile Equipment Identifier (IMEI). The identifiers can be transmitted to a network server to identify users or equipment.

The mobile device 800 can support one or more input devices 830 including, but not limited to, a screen 832 that is touch or hover sensitive, a microphone 834, a camera 836, a physical keyboard 838, or trackball 840. The mobile device 800 may also support output devices 850 including, but not limited to, a speaker 852 and a display 854. Other possible input devices (not shown) include accelerometers (e.g., one dimensional, two dimensional, three dimensional). Other possible output devices (not shown) can include piezoelectric or other haptic output devices. Some devices can serve more than one input/output function. The input devices 830 can include a Natural User Interface (NUI). An NUI is an interface technology that enables a user to interact with a device in a "natural" manner, free from artificial constraints imposed by input devices such as mice, keyboards, remote controls, and others. Examples of NUI methods include those relying on speech recognition, touch and stylus recognition, gesture recognition (both on screen and adjacent to the screen), air gestures, head and eye tracking, voice and speech, vision, touch, gestures, and machine intelligence. Other examples of a NUI include motion gesture detection using accelerometers/gyroscopes, facial recognition, three dimensional (3D) displays, head, eye, and gaze tracking, immersive augmented reality and virtual reality systems, all of which provide a more natural interface, as well as technologies for sensing brain activity using electric field sensing electrodes (electro-encephalogram (EEG) and related methods). Thus, in one specific example, the operating system 812 or applications 814 can comprise speech-recognition software as part of a voice user interface that allows a user to operate the device 800 via voice commands. Further, the device 800 can include input devices and software that allow for user interaction via a user's spatial gestures, such as detecting and interpreting gestures to provide input to an application.

A wireless modem 860 can be coupled to an antenna 891. In some examples, radio frequency (RF) filters are used and the processor 810 need not select an antenna configuration for a selected frequency band. The wireless modem 860 can support two-way communications between the processor 810 and external devices. The modem 860 is shown generically and can include a cellular modem for communicating with the mobile communication network 804 and/or other radio-based moderns (e.g., Bluetooth 864 or Wi-Fi 862). The wireless modem 860 may be configured for communication with one or more cellular networks, such as a Global system for mobile communications (GSM) network for data and voice communications within a single cellular network, between cellular networks, or between the mobile device and a public switched telephone network (PSTN). Mobile device 800 may also communicate locally using, for example, near field communication (NFC) element 892.

The mobile device 800 may include at least one input/output port 880, a power supply 882, a satellite navigation system receiver 884, such as a Global Positioning System (GPS) receiver, an accelerometer 886, or a physical connector 890, which can be a Universal Serial Bus (USB) port, IEEE 1394 (FireWire) port, RS-232 port, or other port. The illustrated components 802 are not required or all-inclusive, as other components can be deleted or added.

Mobile device 800 may include a service endpoint management logic 899 that is configured to provide a functionality for the mobile device 800. For example, service endpoint management logic 899 may provide a client for interacting with a service (e.g., service 760, FIG. 7). Portions of the example methods described herein may be performed by service endpoint management logic 899. Similarly, service endpoint management logic 899 may implement portions of apparatus described herein.

The following includes definitions of selected terms employed herein. The definitions include various examples or forms of components that fall within the scope of a term and that may be used for implementation. The examples are not intended to be limiting. Both singular and plural forms of terms may be within the definitions.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage medium", as used herein, refers to a medium that stores instructions or data. "Computer-readable storage medium" does not refer to propagated signals. A computer-readable storage medium may take forms, including, but not limited to, non-volatile media, and volatile media. Non-volatile media may include, for example, magnetic disks, tapes, and other media. Volatile media may include, for example, semiconductor memories, dynamic memory, and other media. Common forms of a computer-readable storage medium may include, but are not limited to, a floppy disk, a flexible disk, a hard disk, a magnetic tape, other magnetic medium, an application specific integrated circuit (ASIC), a compact disk (CD), a random access memory (RAM), a read only memory (ROM), a memory chip or card, a memory stick, and other media from which a computer, a processor or other electronic device can read.

"Data store", as used herein, refers to a physical or logical entity that can store data. A data store may be, for example, a database, a table, a file, a list, a queue, a heap, a memory, a register, and other physical repository. In different examples, a data store may reside in one logical or physical entity or may be distributed between two or more logical or physical entities.

"Logic", as used herein, includes but is not limited to hardware, firmware, software in execution on a machine, or combinations of each to perform a function(s) or an action(s), or to cause a function or action from another logic, method, or system. Logic may include a software controlled microprocessor, a discrete logic (e.g., ASIC), an analog circuit, a digital circuit, a programmed logic device, a memory device containing instructions, and other physical devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

To the extent that the term Includes' or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the Applicant intends to indicate "only A or B but not both" then the term "only A or B but not both" will be employed. Thus, use of the term "or" herein is the inclusive, and not the exclusive use. See, Bryan A Gamer, A Dictionary of Modern Legal Usage 624 (2d. Ed. 1995).

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:
1. A method, comprising:
receiving a service management request concerning a service endpoint device from a service manager, mere the service endpoint device is a member of a collection of service endpoint devices that co-operate to provide a service, where the service is a set of functionalities provided through a communication network;
controlling a serialization logic to serialize the service management request with respect to other pending service management requests concerning members of the collection, where the serialization logic is located in a communication path in the communication network between the service manager and the control device;

processing the service management request in order with respect to the other pending service management requests;

upon determining that the service management request is an optional attempt to take the service endpoint device out-of-service:

accessing in-service data from which a determination can be made concerning whether the service endpoint device is the only in-service service endpoint device in the collection;

where accessing the in-service data comprises accessing data local to the service manager, accessing data local to the serialization logic, and accessing data local to the message passer;

making the determination based, at least in part, on the in-service data; and where making the determination comprises a function of the data local to the service manager, the data local to the serialization logic, and the data local to the message passer;

when the determination is that the service endpoint device is not the only in-service service endpoint device in the collection, informing a control device that participates in controlling the service endpoint device that the service endpoint device is to be taken out-of-service and controlling the message passer to take the service endpoint device out-of-service;

where informing the control device comprises informing the serialization logic;

where informing the control device further comprises informing a message passer that controls message flow to the service endpoint device, where the message passer is located in a communication path in the communication network between the serialization logic and the service endpoint device, and wherein the message passer is a load balancer;

when the determination is that the service endpoint device is the only in-service service endpoint device in the collection, signaling the service manager that the membership request has not been performed and selectively updating the in-service data in one or more locations in the communication network.

2. The method of claim 1, comprising:

acquiring the in-service data from one or more members of the collection and from the control device, and providing the in-service data to the service manager, where the in-service data provides a single coherent view of the collection of service endpoint devices.

3. The method of claim 1, where the service endpoint device is a server.

4. The method of claim 1, where the service manager is an automated process.

5. The method of claim 1, where taking the service endpoint device out-of-service comprises stopping message flow to the service endpoint device.

6. The method of claim 5, where the message passer is a load balancer located on a communication path in the communication network between a user of the service and the service endpoint device.

7. The method of claim 1, where the in-service data also describes the health of the service endpoint device.

8. The method of claim 1, comprising controlling the serialization logic to perform peephole optimization on pending service management requests.

9. The method of claim 1, comprising:

providing a role-based service level for the service manager as a function of authenticating the service manager.

10. The method of claim 1, where the service endpoint device is taken out-of-service or the service manager is signaled in less than fifteen seconds of receiving the service management request.

11. A computer-readable storage medium storing computer-executable instructions that when executed by a computer cause the computer to perform a method, the method comprising:

authenticating a service manager;

providing a role-based service level for the service manager as a function of authenticating the service manager;

providing in-service data to the service manager, where the in-service data provides a single coherent view of a collection of servers that co-operate to provide a service, where the service is a set of functionalities provided through a communication network;

receiving a take-out-of-service request concerning a server from a service manager, where the server is a member of the collection;

controlling a serialization logic to serialize the take-out-of-service request with respect to other pending take-out-of-service requests concerning members of the collection, where the serialization logic is located in a communication path in the communication network between the service manager and the control device;

processing the take-out-of-service request in order with respect to the: other pending take-out-of-service requests;

accessing in-service data from which a determination can be made concerning whether the server is the only in-service server in the collection; and making the determination in an incremental fashion based, at least in part, on the in-service data, where making the determination in an incremental fashion comprises accessing in-service data in order from the service manager to a user interface to the serialization logic to a load balancer configured to control message flow to the server;

when the determination is that the server is not the only in-service server in the collection, providing the take-out-of-service request to the load balancer in the communication network; and when the determination is that the server is the only in-service server in the collection, selectively providing the take-out-of-service request back to the service manager with a notification and selectively updating the in-service data in one or more locations in: the communication network, where the server is taken out-of-service or the service manager is provided with the notification in less than fifteen seconds from receiving the take-out-of-service request.

* * * * *